(12) United States Patent
Hsieh et al.

(10) Patent No.: US 7,830,455 B2
(45) Date of Patent: Nov. 9, 2010

(54) TV SET AND METHOD FOR MANAGING GAIN VALUE FOR EACH CHANNEL

(75) Inventors: Kuan-Hong Hsieh, Guangdong (CN); Wen-Chuan Lian, Guangdong (CN); Wen-Sheng Tsai, Guangdong (CN); Xiao-Guang Li, Guangdong (CN); Bing Li, Guangdong (CN)

(73) Assignees: Hong Fu Jin Precision Industry (Shen Zhen) Co., Ltd., Longhua Town, Bao'an District, Shenzhen, Guangdong Province (CN); Hon Hai Precision Industry Co., ltd., Tu-Cheng, Taipei Hsien (TW)

( * ) Notice: Subject to any disclaimer, the term of this patent is extended or adjusted under 35 U.S.C. 154(b) by 1038 days.

(21) Appl. No.: 11/557,087

(22) Filed: Nov. 6, 2006

(65) Prior Publication Data

US 2007/0103600 A1 May 10, 2007

(30) Foreign Application Priority Data

Nov. 9, 2005 (CN) .......................... 2005 1 0101229

(51) Int. Cl.
*H04N 5/52* (2006.01)
*H04N 5/50* (2006.01)

(52) U.S. Cl. .................... 348/678; 348/731; 348/725; 348/738

(58) Field of Classification Search ................ 348/678, 348/725, 731–733, 736, 738, 470, 484; 725/38, 725/131, 139, 151; *H04N 5/52, 5/50*
See application file for complete search history.

(56) References Cited

U.S. PATENT DOCUMENTS

| 5,963,843 | A | * | 10/1999 | Sit et al. ...................... 725/146 |
| 7,647,221 | B2 | * | 1/2010 | Michener ................. 704/200.1 |
| 2002/0003586 | A1 | * | 1/2002 | Busson et al. ............... 348/731 |
| 2004/0199933 | A1 | | 10/2004 | Ficco | |

* cited by examiner

*Primary Examiner*—Trang U Tran
(74) *Attorney, Agent, or Firm*—Winston Hsu; Scott Margo; Min-Lee Teng (57) ABSTRACT

The present invention relates to method for managing gain value for each channel of a TV set, includes steps: signaling a tuner to receive broadcasting signals of the channel in response to a channel selection command; reading a predetermined gain value of the channel from a setting table; amplifying and outputting audio signals extracted from the broadcasting signals of the channel according to the predetermined gain value of the channel; signaling a gain control unit to adjust a current gain value to an adjusted gain value if receiving a gain adjustment command; amplifying the audio signals of the channel according to the adjusted gain value; calculating an integrated gain value according to the adjusted gain value and the predetermined gain value; and updating the predetermined gain value of the channel using the integrated gain value. The present invention also provides a corresponding TV set.

12 Claims, 6 Drawing Sheets

TV SET AND METHOD FOR MANAGING GAIN VALUE FOR EACH CHANNEL

BACKGROUND OF THE INVENTION

1. Field of the Invention

The present invention relates to a TV set and method for managing gain value for each channel.

2. Description of Related Art

Traditionally, different audio signals extracted from different broadcasting signals with a TV set have different voltage levels. Thereby when an amplifier of the TV set remains a same gain value, actual audio energy output of each channel differs from each other. The shortcoming of the traditional TV set is that the audio energy output changes when a current channel is changed. Thereby a user needs to manually adjust gain value of the amplifier frequently.

In order to solve the problems mentioned, there is an apparatus and method for automatically compensating a gain value of a TV set available in the market. The apparatus and method automatically compensates gain value of the TV set, whereby decreases manual operations for adjusting the gain value of the TV set. The method includes steps of: receiving a command signal for selecting a channel; dividing audio signals of the channel to a sound part and a soundless part; determining if the audio signals relates to music or voice; calculating an audio energy of the audio signals in a predetermined period; comparing an audio energy in a preceding predetermined period with an audio energy in a former predetermined period to calculate a compensation value; and adjusting gain value of the TV set.

However, the system and method is rigid and not user friendly. In addition, the apparatus and method mentioned are more complex and need more elements to accomplish, thereby increasing the cost of the TV set.

Therefore, a heretofore unaddressed need exists in the industry to overcome the aforementioned deficiencies and inadequacies.

SUMMARY OF THE INVENTION

In order to solve said problems, the present invention provides a TV set and method for managing gain value for each channel.

The method for managing gain value for each channel of a TV set, includes steps of: receiving a channel selection command for selecting a channel; signaling a tuner to receive broadcasting signals of a corresponding channel in response to the channel selection command; reading a predetermined gain value of the channel from a setting table; updating a default gain value using the predetermined gain value; amplifying and outputting audio signals extracted from the broadcasting signals of the channel according to the default gain value; receiving a gain adjustment command for adjusting a gain value; adjusting the default gain value to an adjusted gain value according to the gain adjustment command; updating the default gain value using the adjusted gain value; signaling a gain control unit to amplify the audio signals of the channel according to the default gain value; calculating an integrated gain value according to the predetermined gain value and the default gain value; and updating the predetermined gain value of the channel using the integrated gain value.

The TV set for automatically managing gain value for each channel includes a gain control unit, a command input unit, a tuner, a storage unit, a gain management unit and a central processing unit. The gain control unit amplifies audio signals of each channel of the TV set. The command input unit generates a channel selection command and a gain adjustment command in response to operational inputs. The central processing unit signals the tuner to receive broadcasting signals of a channel corresponding to a channel selection command. The storage unit stores a default gain value and a setting table. A plurality of predetermined gain values of each channel of the TV set are listed in the setting table.

The gain management unit includes an obtaining module, a gain adjusting module, a calculating module and a setting module. The obtaining module reads a predetermined gain value of the channel from the setting table, updates the default gain value using the predetermined gain value, and signals the gain control unit to amplify audio signals extracted from the broadcasting signals of the channel according to the default gain value. The gain adjustment module adjusts the default gain value to an adjusted gain value, updates the default gain value using the adjusted gain value, and signals the gain control unit to amplify the audio signals of the channel according to the default gain value, if receiving the gain adjustment command. The calculating module calculates an integrated gain value according to the predetermined gain value and the default gain value. The setting module updates the predetermined gain value of the channel listed in the setting table using the integrated gain value.

The TV set for automatically managing gain value for each channel includes a gain control unit, a command input unit, a tuner, a central processing unit and a storage unit. The storage unit stores a default gain value and a setting table. A plurality of predetermined gain values of each channel of the TV set are listed in the setting table. The command input unit generates a channel selection command and a gain adjustment command in response to operational inputs. The central processing unit signals the tuner to receive broadcasting signals of a channel corresponding to a channel selection command.

The central processing unit includes an obtaining module, a gain adjusting module, a calculating module and a setting module. The obtaining module reads a predetermined gain value of the channel from the setting table, updates the default gain value using the predetermined gain value, and signals the gain control unit to amplify audio signals extracted from the broadcasting signals of the channel according to the default gain value. The gain adjustment module adjusts the default gain value to an adjusted gain value, updates the default gain value using the adjusted gain value, and signals the gain control unit to amplify the audio signals of the channel according to the default gain value, if receiving the gain adjustment command. The calculating module calculates an integrated gain value according to the predetermined gain value and the default gain value. The setting module updates the predetermined gain value of the channel listed in the setting table using the integrated gain value.

Other systems, methods, features, and advantages will be or become apparent to one with skill in the art upon examination of the following drawings and detailed description. It is intended that all such additional systems, methods, features, and advantages be included within this description, be within the scope of the present invention, and be protected by the accompanying claims.

DETAILED DESCRIPTION OF THE INVENTION

Figure 1:
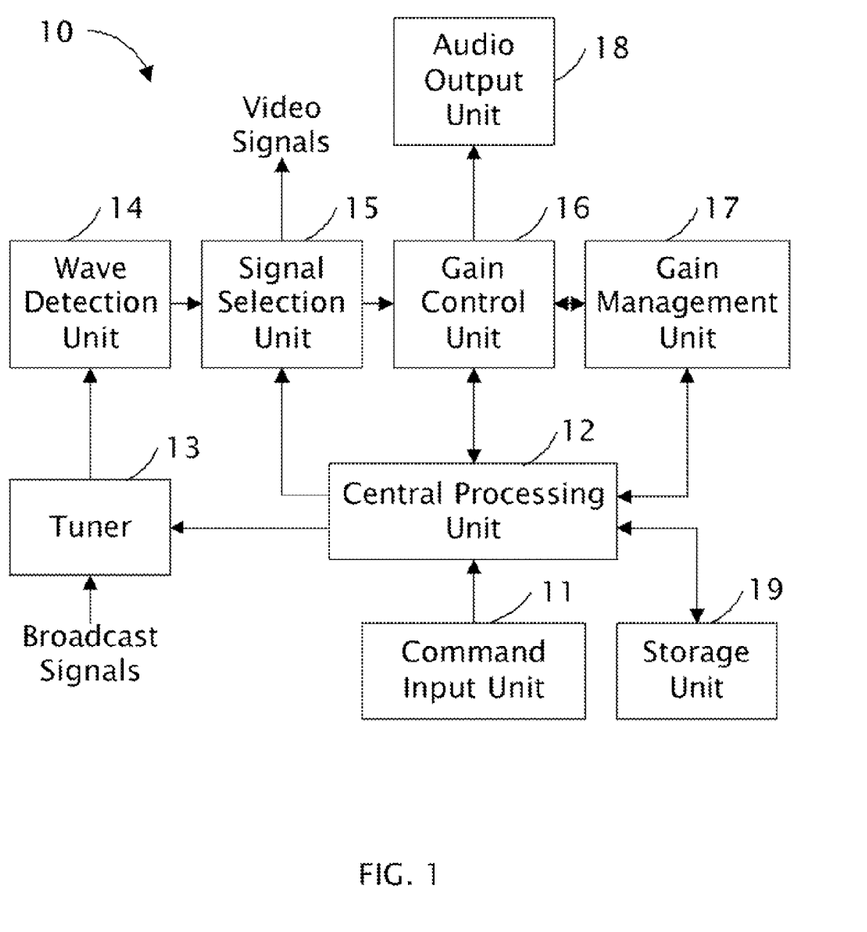
FIG. 1 is a block diagram of a hardware infrastructure of a TV set in accordance with a preferred embodiment of the present invention.

FIG. 1 is a block diagram of a hardware infrastructure of a TV set in accordance with a preferred embodiment of the present invention. The TV set 10 includes a command input unit 11, a central processing unit 12, a tuner 13, a detection unit 14, a signal selection unit 15, a gain control unit 16, a gain management unit 17, an audio output 18, and a storage unit 19.

The central processing unit 12 controls components of the TV set 10 being connected therewith, such as the command input unit 11, the central processing unit 12, the tuner 13, the wave detection unit 14, the signal selection unit 15, the gain control unit 16, the gain management unit 17, and the storage unit 19.

The storage unit 19 stores a default gain value and a setting table. The setting contains a plurality of predetermined gain values of each channel of the TV set 10. The command input unit 11 is used for generating a channel selection command and a gain adjustment command in response to a channel selection input and a gain value adjustment input respectively.

The central processing unit 12 signals the tuner 13 to receive broadcasting signals of a channel in response to the channel selection command. The broadcasting signals include high frequency broadcasting signals via an antenna (not shown) and analog or digital TV signals via a CATV (community antenna television) interface. The tuner 13 amplifies the broadcasting signals of the channel to a predetermined voltage level, and sends the broadcasting signals of the channel amplified to the wave detection unit 14.

The wave detection unit 14 extracts video signals and audio signals from the broadcasting signals of the channel amplified by the tuner 13. The signal selection unit 15 transmits the video signals to a video display unit (not shown) to be displayed, and transmits the audio signals to an audio output unit 18 to output sound corresponding to the audio signals.

Figure 2:
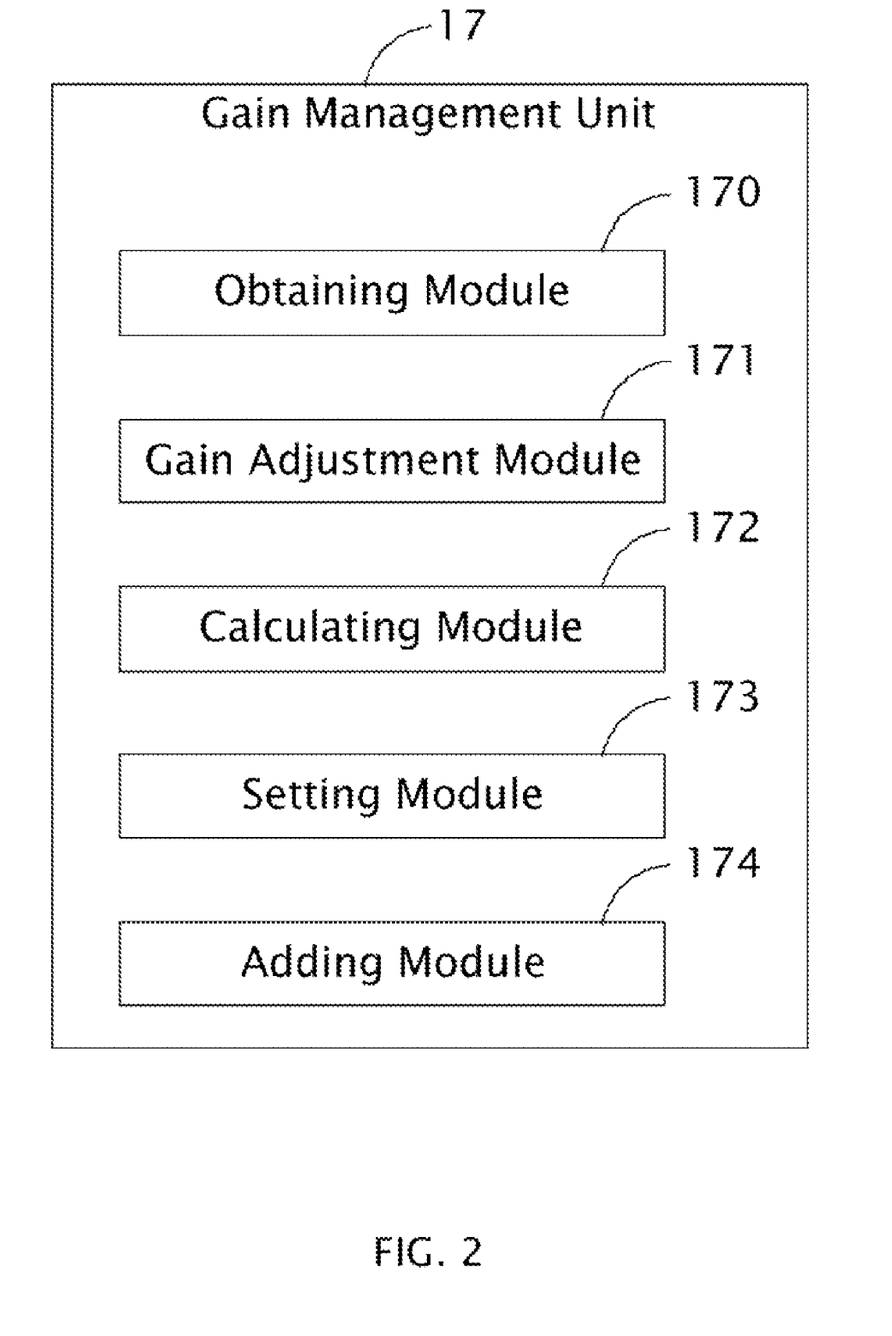
FIG. 2 is a schematic diagram of main function modules of a gain management unit of FIG. 1.

Referring to FIG. 2, the gain management unit 17 further includes an obtaining module 170, a gain adjustment module 171, a calculating module 172, and a setting module 173.

The obtaining module 170 reads a predetermined gain value of the channel according to the broadcasting signals received by the tuner 13 from the setting table in response to the channel selection command, and signals the gain control unit 16 to amplify the audio signals extracted from the broadcasting signals of the channel according to the predetermined gain value of the channel.

While receiving the broadcasting signals of the channel, the gain adjustment module 171 adjusts the default gain value of the channel to an adjusted gain value, signals the gain control unit 16 to amplify the audio signals according to the adjusted gain value, after receiving the gain adjustment command.

The calculating module 172 assigns a weight value respectively to the predetermined gain value and the adjusted gain value, multiplies the predetermined gain value and the adjusted gain value by the corresponding weight value assigned, thereby obtaining two products, and sums the two products to obtain an integrated gain value.

The setting module 173 updates the predetermined gain value of the channel listed in the setting table using the integrated gain value.

The gain management unit 17 further includes an adding module 174. If the obtaining module 170 detects that the channel is originally not listed in the setting table, the adding module 174 adds the channel to the setting table, obtains the default gain value (after adjustment, i.e., the adjusted gain value) from the storage unit 19, and adds the default gain value to the setting table as the predetermined gain value of the channel.

If the obtaining module 170 detects that the predetermined gain value of the channel is originally not listed in the setting table, the adding module 174 obtains the default gain value from the storage unit 19, and adds the default gain value to the setting table acting as the predetermined gain value of the channel.

Figure 3:
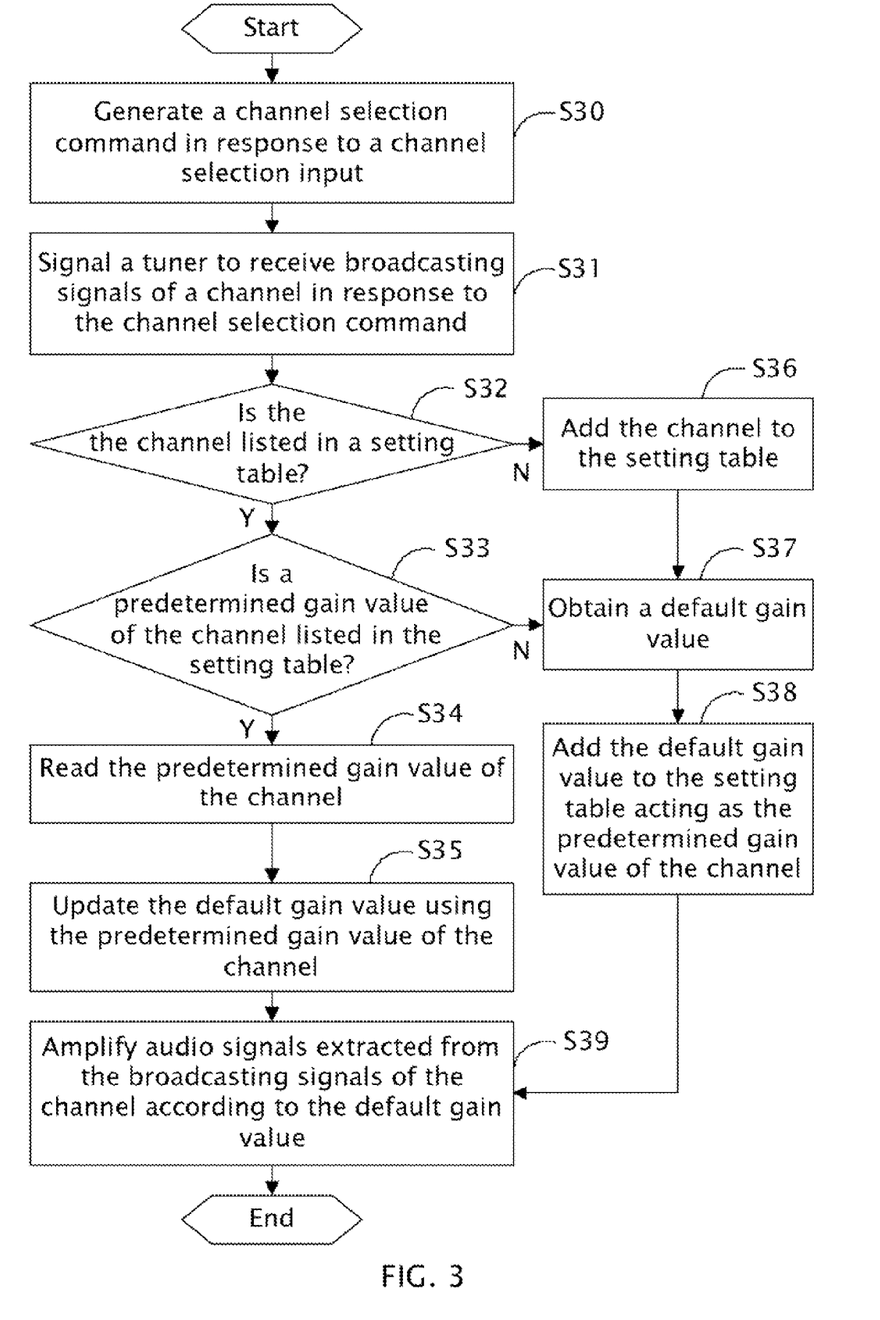
FIG. 3 is a flowchart of a preferred method of automatically adjusting a predetermined gain value of a current channel by utilizing the TV set of FIG. 1.

FIG. 3 is a flowchart of a preferred method of automatically adjusting a predetermined gain value of a current channel by utilizing the TV set 10 of FIG. 1. In step S30, the command input unit 11 generates the channel selection command in response to the selection input for selecting the channel.

In step S31, the central processing unit 12 receives the channel selection command from the command input unit 11, signals the tuner 13 to receive broadcasting signals of a corresponding channel in response to the channel selection command.

In step S32, the obtaining module 170 determines whether the channel selected by the tuner 13 is listed in the setting table. If the obtaining module 170 detects that the channel is not originally listed in the setting table, the procedure goes to step S36 described below.

If the obtaining module 170 detects that the channel is listed in the setting table, in step S33, the obtaining module 170 also detects whether the predetermined gain value of the channel is originally listed in the setting table. If the obtaining module 170 detects that the predetermined gain value of the channel is not originally listed in the setting table, the procedure goes to step S37 described below.

If the obtaining module 170 determines that the predetermined gain value of the channel is originally listed in the setting table, in step S34, the obtaining module 170 reads the predetermined gain value of the channel from the setting table.

In step S35, the obtaining module 170 updates the default gain value stored in the storage unit 19 using the predetermined gain value.

In step S39, the obtaining module 170 signals the gain control unit 16 to amplify the audio signals extracted from the broadcasting signals of the channel according to the default gain value, and then the procedure is finished.

In step S36, namely where the channel is not originally listed in the setting table, the adding module 174 adds the channel to the setting table. In step S37, the adding module 174 obtains the default gain value from the storage unit 19.

In step S38, the adding module 174 adds the default gain value to the setting table acting as a predetermined gain value of the channel added in the setting table, and then the step goes to step S39.

Figure 4:
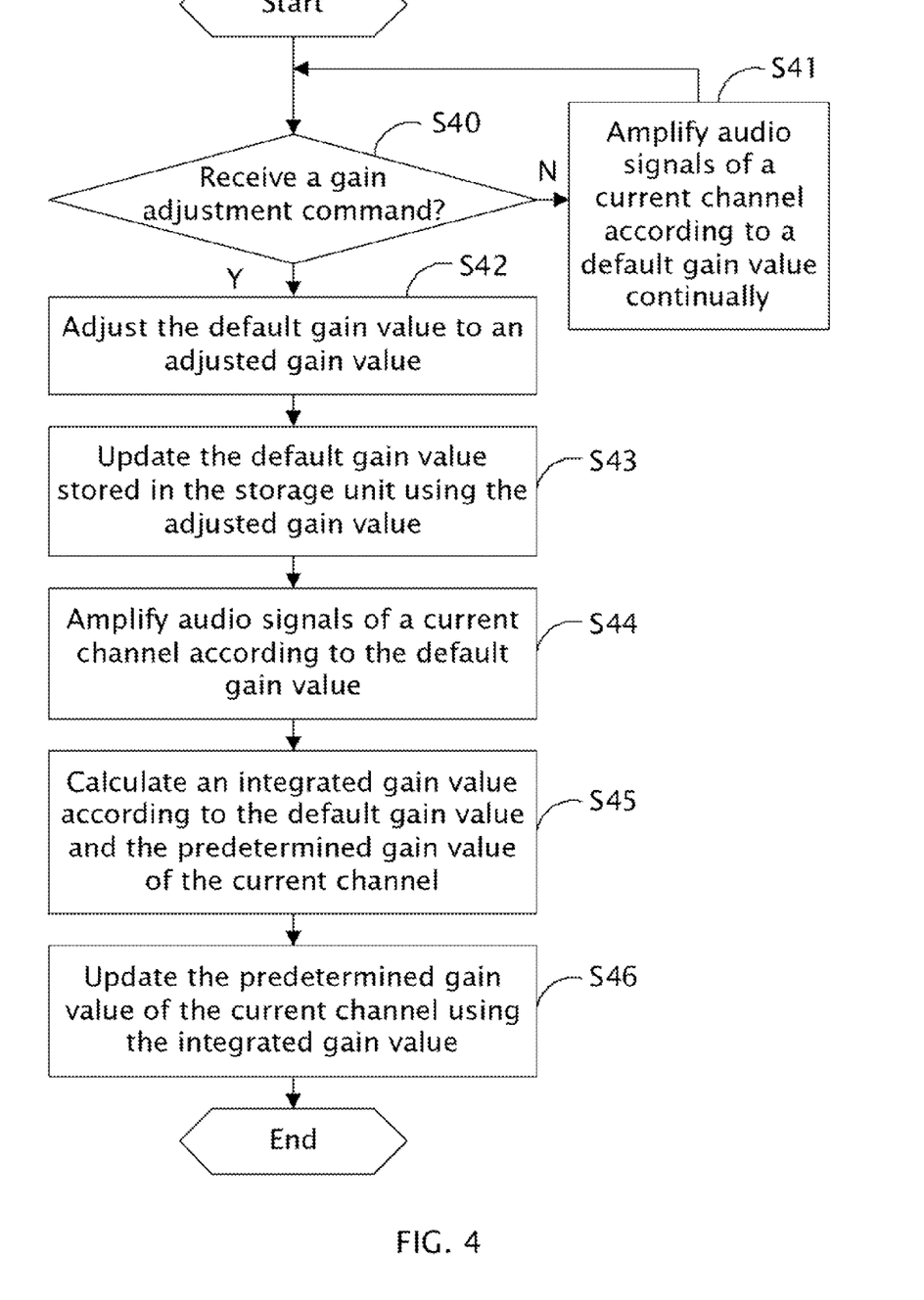
FIG. 4 is a flowchart of a preferred method of regenerating a predetermined gain value of a channel by utilizing the TV set of FIG. 1.

FIG. 4 is a flowchart of a preferred method of regenerating a predetermined gain value of a current channel by utilizing the TV set 10 of FIG. 1.

In step S40, the gain adjustment module 171 determines whether it receives the gain adjustment command from the command input unit 11. If the gain adjustment module 171 does not receive the gain adjustment command, in step S41, the gain adjustment module 171 signals the gain control unit 16 to continually amplify the audio signals of the current channel according to the default gain value (if the current channel having the predetermined gain value, i.e., the predetermined gain value).

If the gain adjustment module 171 receives the gain adjustment command, in step S42, the gain adjustment module 171 signals the gain control unit 16 to adjust the default gain value to an adjusted gain value.

In step S43, the gain adjustment module 171 updates the default gain value stored in the storage unit 19 using the adjusted gain value.

In step S43, the gain adjustment module 171 signals the gain control unit 16 to amplify the audio signals of the current channel according to the default gain value.

In step S45, the calculating module 172 assigns a weight value respectively to the predetermined gain value of the current channel and the default gain value, multiplies respectively the predetermined gain value and the default gain value by the corresponding weight value assigned, thereby obtaining two products, and sums the two products to obtain the integrated gain value.

In step S46, the setting module 173 updates the predetermined gain value of the current channel listed in the setting table using the integrated gain value.

Figure 5:
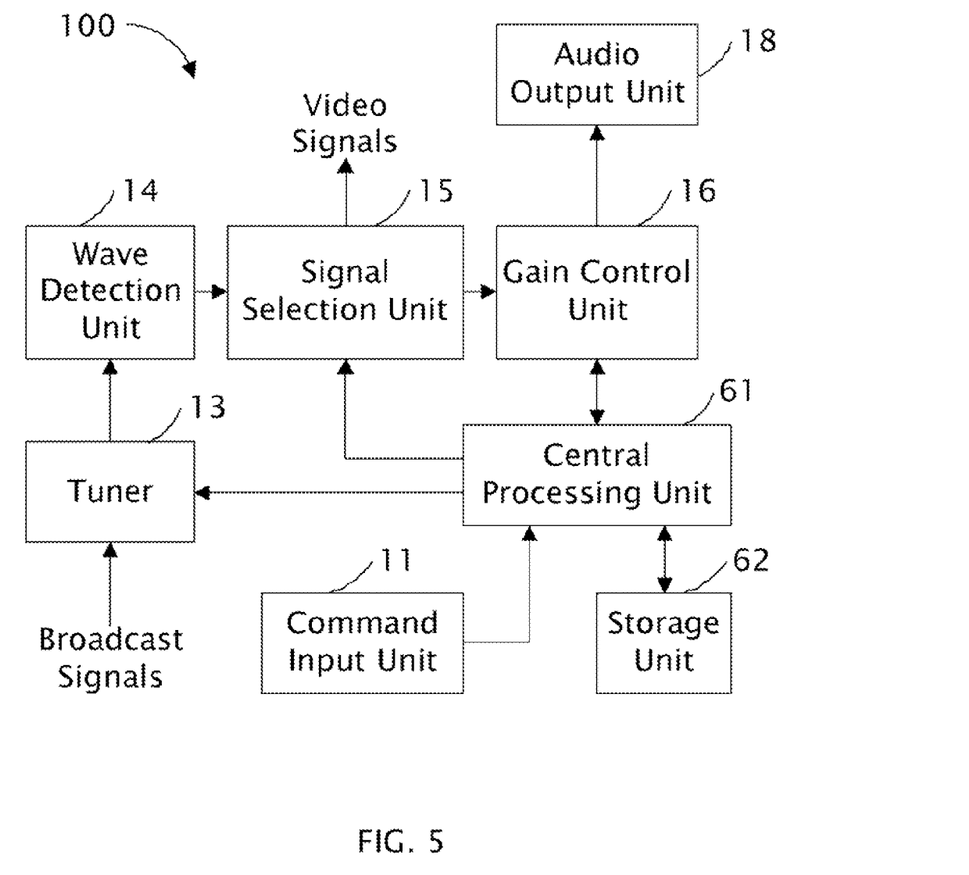
FIG. 5 is a block diagram of a hardware infrastructure of a TV set in accordance with an alternative embodiment of the present invention.

FIG. 5 is a block diagram of a hardware infrastructure of a TV set in accordance with an alternative embodiment of the present invention. The TV set of the alternative embodiment is the same as that of the preferred embodiment, except that the gain management unit 17 is included in the central processing unit 12.

Figure 6:
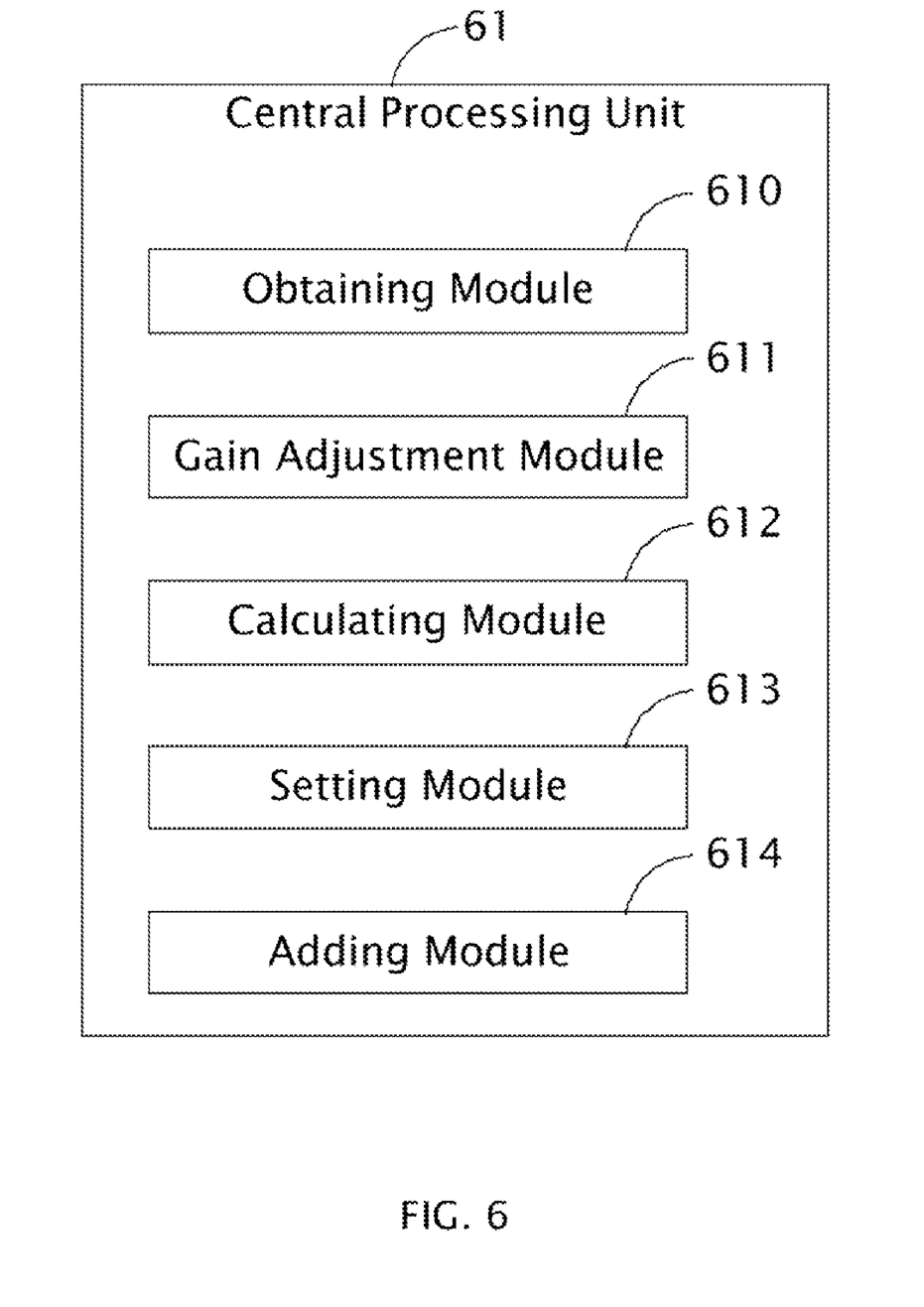
FIG. 6 is a schematic diagram of main function modules of a gain management unit of FIG. 5.

Therefore, in this alternative embodiment, the central processing unit 12 further has the function as well as the gain management unit 17 does in FIG. 1. That is, the central processing unit 12 has an obtaining module 610, a gain adjustment module 611, a calculating module 612, a setting module 613 and an adding module 614, which respectively performs the same functions as the obtaining module 170, a gain adjustment module 171, a calculating module 172, a setting module 173 and an adding module 174 of the gain management unit 17.

It should be emphasized that the above-described embodiments, including preferred embodiments, are merely possible examples of implementations, and are set forth for a clear understanding of the principles of the invention. Many variations and modifications may be made to the above-described embodiments without departing substantially from the spirit and principles of the invention. All such modifications and variations are intended to be included herein within the scope of this disclosure and the present invention, and be protected by the following claims.

What is claimed is:

1. A method for managing gain value for each channel of a TV set, the method comprising the steps of:
receiving a channel selection command for selecting a channel;
signaling a tuner to receive broadcasting signals of a corresponding channel in response to the channel selection command;
reading a predetermined gain value of the channel from a setting table;
updating a default gain value using the predetermined gain value;
amplifying and outputting audio signals extracted from the broadcasting signals of the channel according to the default gain value;
receiving a gain adjustment command for adjusting a gain value;
adjusting the default gain value to an adjusted gain value according to the gain adjustment command;
updating the default gain value using the adjusted gain value;
signaling a gain control unit to amplify the audio signals of the channel according to the default gain value;
calculating an integrated gain value according to the predetermined gain value and the default gain value; and
updating the predetermined gain value of the channel using the integrated gain value.

2. The method according to claim 1, further comprising the step of:
adding the channel to the setting table, obtaining a default gain value, and adding the default gain value to the setting table acting as a predetermined gain value of the channel, if the channel is not originally listed in the setting table.

3. The method according to claim 1, further comprising the steps of: obtaining a default gain value, and adding the default gain value to the setting table acting as the predetermined gain value of the channel, if the predetermined gain value of the channel is not originally listed in the setting table.

4. The method according to claim 1, wherein the calculating step comprises the steps of:
assigning a weight value respectively to the predetermined gain value and the default gain value;
multiplying respectively the predetermined gain value and the default gain value by the corresponding weight value assigned thereby obtain two products; and
summing the two products to obtain the integrated gain value.

5. A TV set for automatically managing gain value for each channel, the TV set comprising a gain control unit, a command input unit, a central processing unit, a tuner, a storage unit and a gain management unit, the gain control unit being configured for amplifying audio signals of each channel of the TV set, the command input unit being configured for generating a channel selection command and a gain adjustment command in response to operational inputs, the central processing unit being configured for signaling the tuner to receive broadcasting signals of a channel in response to a corresponding channel selection command, wherein:
the storage unit stores a default gain value and a setting table, a plurality of predetermined gain values of the channels are listed in the setting table;
the gain management unit comprises:
an obtaining module for reading a predetermined gain value of the channel from the setting table, updating the default gain value using the predetermined gain value, and signaling the gain control unit to amplify audio signals extracted from the broadcasting signals of the channel according to the default gain value;
a gain adjustment module for adjusting the default gain value to an adjusted gain value, updating the default gain value using the adjusted gain value, and signaling the gain control unit to amplify the audio signals of the channel according to the default gain value, if receiving the gain adjustment command;
a calculating module for calculating an integrated gain value according to the predetermined gain value and the default gain value; and a setting module for updating the predetermined gain value of the channel listed in the setting table using the integrated gain value.

6. The TV set according to claim 5, wherein the gain management unit further comprises an adding module for adding the channel to the setting table, obtaining the default gain value, and adding the default gain value to the setting table acting as a predetermined gain value of the channel, if the channel is originally not listed in the setting table.

7. The TV set according to claim 5, wherein the gain management unit further comprises an adding module for obtaining the default gain value, and adding the default gain value to the setting table acting as the predetermined gain value of the channel, if the predetermined gain value of the channel is originally not listed in the setting table.

8. The TV set according to claim 5, wherein the calculating module assigns a weight value respectively to the predetermined gain value and the default gain value, multiplies respectively the predetermined gain value and the default gain value by the corresponding weight value assigned thereby obtaining two products, and sums the two products to obtain the integrated gain value.

9. A TV set for automatically managing gain value for each channel, the TV set comprising a gain control unit, a command input unit, a central processing unit and a storage unit, the gain control unit for amplifying audio signals of each channel of the TV set, the command input unit for generating a channel selection command and a gain adjustment command in response to operational inputs, the central processing unit for signaling a tuner to receive broadcasting signals of a channel corresponding to a channel selection command, wherein, the storage unit stores a default gain value and a setting table, a plurality of predetermined gain values of the channels are listed in the setting table; and the central processing unit comprises:

an obtaining module for reading a predetermined gain value of the channel from the setting table, updating the default gain value using the predetermined gain value, and signaling the gain control unit to amplify audio signals extracted from the broadcasting signals of the channel according to the default gain value;

a gain adjustment module for adjusting the default gain value to an adjusted gain value, updating the default gain value using the adjusted gain value, and signaling the gain control unit to amplify the audio signals of the channel according to the default gain value, if receiving the gain adjustment command;

a calculating module for calculating an integrated gain value according to the predetermined gain value and the default gain value; and a setting module for updating the predetermined gain value of the channel listed in the setting table using the integrated gain value.

10. The TV set according to claim 9, wherein the central processing unit further comprises an adding module for adding the channel to the setting table, obtaining the default gain value, and adding the default gain value to the setting table acting as a predetermined gain value of the channel, if the channel is originally not listed in the setting table.

11. The TV set according to claim 9, wherein the central processing unit further comprises an adding module for obtaining the default gain value, and adding the default gain value to the setting table acting as the predetermined gain value of the channel, if the predetermined gain value of the channel is originally not listed in the setting table.

12. The TV set according to claim 9, wherein the calculating module assigns a weight value respectively to the predetermined gain value and the default gain value, multiplies respectively the predetermined gain value and the default gain value by the corresponding weight value assigned thereby obtaining two products, and sums the two products to obtain the integrated gain value.

* * * * *